(12) United States Patent
Nielsen et al.

(10) Patent No.: US 12,044,214 B2
(45) Date of Patent: Jul. 23, 2024

(54) RELATING TO VOLTAGE CONTROL IN RENEWABLE ENERGY POWER PLANTS

(71) Applicant: VESTAS WIND SYSTEMS A/S, Aarhus N (DK)

(72) Inventors: Per Hagen Nielsen, Tilst (DK); Torsten Lund, Fredericia (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/257,965

(22) PCT Filed: Dec. 14, 2021

(86) PCT No.: PCT/DK2021/050364
§ 371 (c)(1),
(2) Date: Jun. 16, 2023

(87) PCT Pub. No.: WO2022/128032
PCT Pub. Date: Jun. 23, 2022

(65) Prior Publication Data
US 2024/0003333 A1    Jan. 4, 2024

(30) Foreign Application Priority Data
Dec. 18, 2020   (DK) ............... PA 2020 70855

(51) Int. Cl.
*H02J 3/18*    (2006.01)
*F03D 7/02*    (2006.01)
(Continued)

(52) U.S. Cl.
CPC .......... *F03D 7/0284* (2013.01); *F03D 7/048* (2013.01); *H02J 3/50* (2013.01); *F05B 2270/337* (2013.01); *H02J 2300/28* (2020.01)

(58) Field of Classification Search
CPC .......... F03D 7/0284; F03D 7/048; H02J 3/50; H02J 2300/28; F05B 2270/337
See application file for complete search history.

(56) References Cited

U.S. PATENT DOCUMENTS

| | | | |
|---|---|---|---|
| 10,767,630 B1 * | 9/2020 | Venkitanarayanan | .. F03D 7/028 |
| 2015/0137520 A1 * | 5/2015 | Garcia | ...... H02J 3/50 290/44 |

(Continued)

FOREIGN PATENT DOCUMENTS

| | | |
|---|---|---|
| EP | 3171477 A1 | 5/2017 |
| EP | 3723230 A1 | 10/2020 |
| WO | 2015193199 A1 | 12/2015 |

OTHER PUBLICATIONS

Danish Patent and Trademark Office, 1st Technical Examination including The Search Opinion and Search Report for Application PA 2020 70855 dated Jul. 15, 2021.

(Continued)

*Primary Examiner* — Mohamed Charioui
*Assistant Examiner* — Christine Y Liao
(74) *Attorney, Agent, or Firm* — Patterson + Sheridan, LLP

(57) ABSTRACT

A method for controlling one or more renewable power generators forming a renewable power plant, and a controller configured to perform the method. In one aspect, plant voltage control is carried out on the basis of a more accurate voltage-reactive power relationship value which is determined dynamically based on grid conditions rather than the conventional approach of the voltage-reactive power relationship being a static value that is based on information provided by a transmission system operator during installation or commissioning of the power plant.

10 Claims, 9 Drawing Sheets

(51) Int. Cl.
*F03D 7/04* (2006.01)
*H02J 3/50* (2006.01)

(56) References Cited

U.S. PATENT DOCUMENTS

| | | | |
|---|---|---|---|
| 2015/0280629 A1 | 10/2015 | Diedrichs et al. | |
| 2017/0025853 A1* | 1/2017 | Jóhansson | H02J 3/04 |
| 2017/0338652 A1* | 11/2017 | Ubben | H02J 3/18 |
| 2020/0052493 A1* | 2/2020 | Kolhatkar | H02J 3/46 |
| 2020/0083710 A1 | 3/2020 | Ganireddy et al. | |
| 2020/0328611 A1* | 10/2020 | Sagi | H02J 3/38 |
| 2021/0140408 A1* | 5/2021 | Gomes | H02J 3/40 |

OTHER PUBLICATIONS

PCT, International Search Report and Written Opinion of The International Searching Authority for Application PCT/DK2021/050364 dated Mar. 21, 2022.
Sakamuri et al., "Coordinated Voltage Control in Offshore HDVC Connected Cluster of Wind Power Plants," IEEE Journal on Sustainable Energy, vol. 7, No. 4, Dated: Oct. 1, 2016, pp. 1592-1601.

* cited by examiner

RELATING TO VOLTAGE CONTROL IN RENEWABLE ENERGY POWER PLANTS

TECHNICAL FIELD

This disclosure relates to a method and a control system for providing improved voltage control capability in renewable energy power plants, and is particularly relevant to weak grid environments.

BACKGROUND

The interconnection between a renewable energy power plant and a power network may, under certain situations, be described as being a 'weak grid interconnection'. In other words, the power plant is connected to a power network that is considered to be a 'weak grid' at the point of interconnection. The presence of a weak grid means that small changes in reactive/active power exchange between the power plant and the network may result in large changes in voltage.

Conventionally, the predominant power source for power distribution grids has been fossil-fuel power plants. However, with the growing penetration of renewable energy power plants such as wind, solar and hybrid has meant that a greater number of power plants are being connected into the power distribution network which, in turn, means that the stability of those networks has tended to reduce such that some parts of the network are considered to be weak.

The weak grid introduces the risk for a renewable energy power plant to destabilise voltage levels. Therefore, it is desirable for renewable energy power plants to act to both restrict actions that produce destabilisation and to act to mitigate any destabilisation that occurs.

A centralized control scheme, as may also be conventionally implemented, has the advantage of being able to control the voltage at the point of connection which is where grid requirements are typically stated and so, in theory, such a control scheme is able to react to voltage changes on the network and take action to adjust reactive power supply in an effort to stabilise the grid. However, the electrical dynamics of the grid can mean that the adjustments made to stabilise the voltage can in some circumstances cause further instability.

It is against this background that the invention has been devised.

SUMMARY OF THE INVENTION

According to an aspect of the present invention there is provided a method for controlling one or more renewable power generators forming a renewable power plant. The method comprises: receiving a measured voltage level of a power network to which the one or more renewable power generators are connected; determining reactive power set points for the one or more renewable power generators based on the measured voltage level; and dispatching the reactive power set points to controllers of the one or more renewable power generators for controlling the one or more renewable power generators. The step of determining reactive power set points for the one or more renewable power generators based on the measured voltage level comprises dynamically determining a voltage-reactive power relationship value (dV/dQ), based on one or more power network conditions, that is indicative of changes in voltage in response to a change in reactive power; determining a voltage error value between a voltage reference value (Vpc_ref) and the measured voltage level (Vpcc); and determining the reactive power set points based on voltage error value and the dynamically determined voltage-reactive power relationship value (dV/dQ).

An advantage of the invention is that plant voltage control is carried out on the basis of a more accurate voltage-power relationship (dV/dQ) which is determined dynamically based on grid conditions rather than the conventional approach of the voltage-power relationship being a static value that is based on information provided by a transmission system operator during installation or commissioning of the power plant. The power plant operator is therefore able to satisfy the requirements for reactive power support more accurately and reliably.

Preferred and/or optional features of the invention will be apparent from the technical discussion that follows and from the appended claims.

BRIEF DESCRIPTION OF THE DRAWINGS

One or more embodiments of the invention will now be described, by way of example only, with reference to the accompanying drawings, in which.

DETAILED DESCRIPTION

Figure 1:
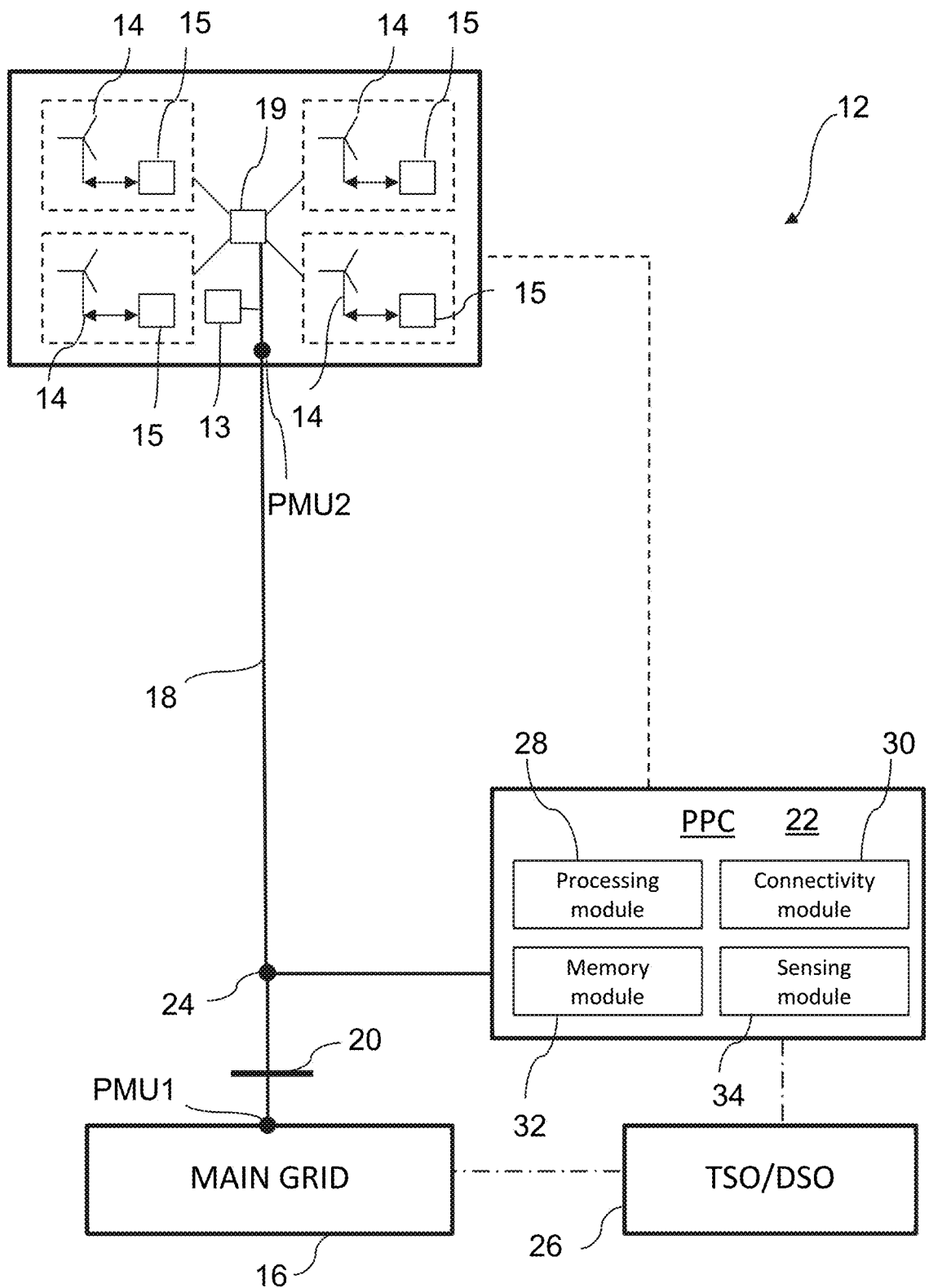
FIG. 1 is a schematic representation of a power network.

FIG. 1 illustrates a typical architecture in which a wind power plant (WPP), which may also be referred to as a wind park or wind farm, is connected to a main grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to both wind power plants, power plants for other renewable energy sources such as solar power plants, wind turbine generators and other renewable energy generating sources, and hybrid power plants having a combination of different types of renewable energy power plants. Thus, the invention also relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition to or as alternatives to the components shown and described in FIG. 1. Such changes would be within the capabilities of the skilled person.

FIG. 1 shows a power network 19 incorporating a WPP 12 and a power plant controller 22 (PPC). The WPP 12 includes a plurality of WTGs 14. Each of the plurality of WTGs 14 converts wind energy into electrical energy, which is transferred from the WPP 12 to a main transmission network or main grid 16, as active power and/or current, for distribution. Individual generators may each be referred to in this description as a 'unit'.

The WPP 12 may also include compensation equipment, shown here generally as '13', such as a static synchronous compensator (STATCOM) or another type of synchronous compensator, configured to provide reactive power or reactive current support as required. The WPP 12 may also include a battery energy storage system, although this option is not shown in FIG. 1.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current and/or power requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 is connected to the main grid 16 (also called the main power network) by a connecting network 18. The WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'.

The WTGs 14 are connected to one another locally by local grid 19, (also called the local power network or park grid). The function of the local grid is to channel power from each of the WTGs 14 to the connecting network 18 to the main grid 16.

The Power Plant Controller (PPC) 22 is connected to the main grid 16 at a Point of Measurement (PoM) 24 and is connected to the WTG controllers 15. The role of the PPC 22 is to act as a command and control interface between the WPP 12 and the grid 16, and more specifically, between the WPP 12 and a grid operator, such as a transmission system operator (ISO) or a distribution system operator (DSO) 26. The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

As part of its operation, the PPC 22 generates and sends dispatch signals to the WTG controllers 15. The WTG controllers 15 control the WTGs according to set points contained within the dispatch signals.

During normal operation, the PPC 22 operates in one of a number of modes. One such mode is a voltage control mode, in which the PPC 22 issues dispatch signals configured to cause the WTGs 14 to supply or absorb reactive power to support the voltage level of the power network. In particular, the PPC 22 supplies signals to the WTGs 14 for maintaining voltage levels between, approximately 0.9 per unit (p.u.) voltage and 1.1 p.u. voltage, as measured at the PoI 20 or PoM 24.

As would be understood by the skilled person, per-unit voltage is an expression of the voltage with respect to a base value which is used as a reference. Using a per-unit system allows for normalization of values across transformers and other components that may change the value by an order of magnitude.

The PPC 22 may issue a variety of different dispatch signals and set points to the WTG controllers 15 for implementation. In the illustrated example, the PPC 22 is configured to issue dispatch signals to the WTG controllers 15 that indicate reactive power set points for the WTGs 14 to meet.

Figure 2:
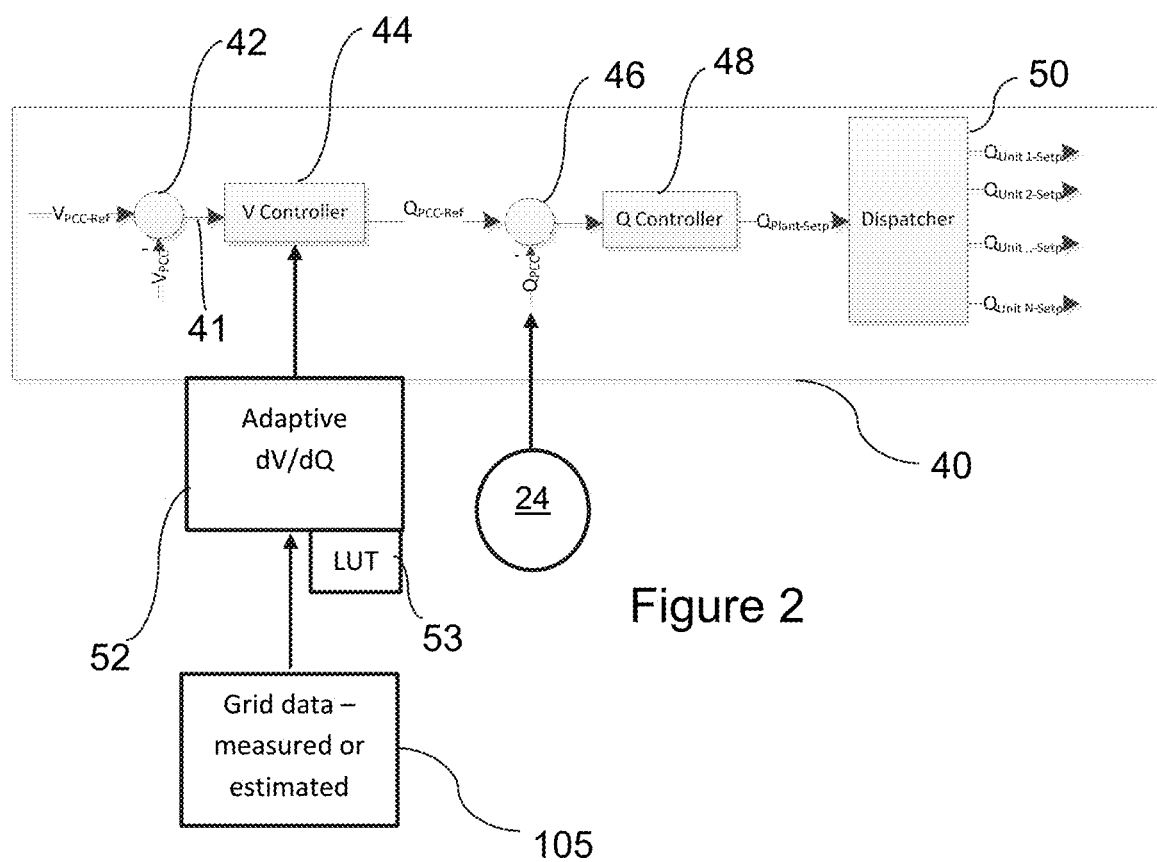
FIG. 2 is a schematic representation of a control scheme featuring dynamic determination of a voltage-power relationship value that is used by a voltage controller to determine reactive power set points, in accordance with an example of the invention.

FIG. 2 illustrates a PPC voltage control unit 40 that forms part of the processing module 28 of the PPC 22. The control unit 40 is configured to generate the dispatch signals for communicating reactive power set points to the WTG controllers 15.

For generating the dispatch signals, the control unit 40 receives a voltage reference level, labelled '$V_{PCC\text{-}Ref}$' in FIG. 2, as an input. The voltage reference level is a voltage level to be achieved at the PoI 20. The voltage reference level may be a pre-set reference, a calculated reference based upon other measurements, or may be a reference received from the TSO or other control operator. Generally, the voltage reference level is around 1 p.u. voltage, and within a permissible/acceptable voltage range of between 0.9 p.u. and 1.1 p.u.

The control unit 40 also receives a measured voltage level, measured at the PoM 24, labelled '$V_{PCC}$' in FIG. 2.

An error value, labelled here as '41' is calculated as the difference between the voltage reference level and the measured voltage level is determined at the subtractor junction 42, by subtracting the measured voltage level from the voltage reference level. This error value is input to a voltage controller 44. The voltage controller 44 calculates a reactive power reference level, '$Q_{PCC\text{-}Ref}$', based on the error value. The voltage controller 44 typically comprises a proportional-integral (PI) controller or a proportional-integral-derivative (PID) controller, and may also include limiters to prevent the reactive power reference level from exceeding certain limits. However, it should be noted at this point the specific form of control scheme is not critical to the current discussion, and PI, PID, more simple proportional controllers, and more complex predictive control schemes are also options.

The reactive power reference level, like the voltage reference level, is a reactive power level that is to be achieved at the PoI 20. Thus, the reactive power reference level is a level to which the output of the WPP 12 is adjusted.

To ensure that the reactive power reference level is met at the PoI 20, the PPC 22 generates a whole-plant set point for the WPP 12 to meet, '$Q_{Plant\text{-}Setp}$.' The plant set point is a set point for the WPP 12 for changing the measured reactive power level at the PoI, '$Q_{PCC}$', to become the reference level $Q_{PCC\text{-}Ref}$.

To generate the plant set-point, the error value between the reference level and the measured reactive power level is calculated at subtractor junction 46 and used as input to a reactive power controller 48. The reactive power controller 48 may comprise a PI,PID controller or a controller implementing another suitable control methodology, along with other control blocks for generating the plant set point.

Having generated a plant set point, a dispatcher 50 distributes the plant set point between the individual WTGs 14 of the WPP 12. The distribution may be performed in a number of ways, such as according to a predetermined split, or based on an optimisation algorithm taking into account the availability of reactive power support from each WTG 14. The output of the dispatcher 50 is a plurality of set points, '$Q_{Unit\text{-}N\text{-}Setp}$', with one set point being provided for each device that absorbs or supplies reactive power in the plant, which in this case are the WTGs 14. The PPC 22 issues these set points as dispatch signals to the individual WTG controllers 15 for controlling the WTGs 14 accordingly.

The WPP 12 and the PoI 20 are connected through the connecting network 18 which can comprise cables, overhead lines and transformers. The connecting network 18 introduces impedance that causes losses between the WPP 12 and the PoI 20, particularly with regard to reactive power. Thus, the set points determined for either the WPP 12 as a whole by the reactive power controller or for the individual WTGs 14 may be determined to account for the losses in reactive power caused by the connecting network 18.

In some cases, a weak grid interconnection may exist. Weak grid interconnections occur most often in remotely located facilities where insufficient infrastructure is provided. Grid weakness is also become more prevalent with the increasing penetration of renewal energy power plants but which are distributed throughout a wide geographical area. Weak grid interconnections cause volatility and instability in the main grid, meaning that small exchanges in reactive or active power at the PoI 20 may result in large fluctuations of grid voltage, and that grid voltage is liable to change quickly. Where weak grid interconnections exist, stability of voltage is particularly important.

In the context of the PPC 22 issuing set points for WTGs 14, a weak grid interconnection may result in instability if the set points change too rapidly. Changing reactive power quickly may cause oscillations in grid voltage.

At this point it should be noted that the above discussion about the operation of the power plant controller 40 describes a conventional approach that would be well understood by a skilled person. What would also be apparent to the skilled person is the typical methodology typically carried out by the voltage controller 44 in order to reference reactive power level $Q_{PCC\text{-}Ref}$. The voltage controller 44 implements an algorithm that ties a voltage differential to a corresponding change in reactive power, that is to say, a 'voltage-reactive power relationship'. This is commonly referred to as the dV/dQ ratio. Therefore, for a change in grid voltage, as is quantified by the error value 41, which is the difference between the measured voltage level of the grid VPCC and the reference voltage level $V_{PCC\text{-}Ref}$, the voltage controller 44 implements an algorithm based on the dV/dQ ratio in order to output a suitable value of reference reactive power $Q_{PCC\text{-}Ref}$.

The dV/dQ ratio is determined during the time the power plant is being commissioned and is typically a static value, because it is assumed that it is relatively constant under typical operating conditions. It is calculated conventionally on information provided to the power plant operator relating to the characteristics of the wider distribution grid in which the power plant will be operating. More specifically, the TSO 26 provides to the power plant operator the short circuit ratio or "SCR". As would be well understood by a skilled person, the concept of an SCR value is used to quantify the strength or stability of a power grid, and is essentially a measure of the Thevenin impedance of the power system. The grid operator is able to calculate a representative SCR value for a proposed powerplant based on its planned structure and relative location and required electrical interconnections with other grid equipment such as distribution lines. Typically, SCR values below 3 are indicative of a weak grid.

Once the power plant operator has been supplied with the representative SCR value for the power plant, it is able to calculate the dV/dQ ratio based on the following relationship: 1/SCR=dV/dQ. Therefore, the SCR value is an important parameter for configuration of the algorithm implemented by the voltage controller 44 to control reactive power injection in response to changes in grid voltage. This relationship is discussed in a paper entitled 'Challenges and solutions for integration of wind power in weak grid areas with high inverter penetration', Lund et al, submitted for the 19$^{th}$ Wind Integration Workshop.

However, a practical limitation of this conventional approach is that the SCR value that is calculated by the TSO is in effect a theoretical estimation and may not be precise. Firstly, in reality the SCR values tends to vary dynamically based on grid conditions. What is more, the SCR value is liable to change over time due to various factors such as the installation of new power plants, change in grid layout and so on.

Figure 3:
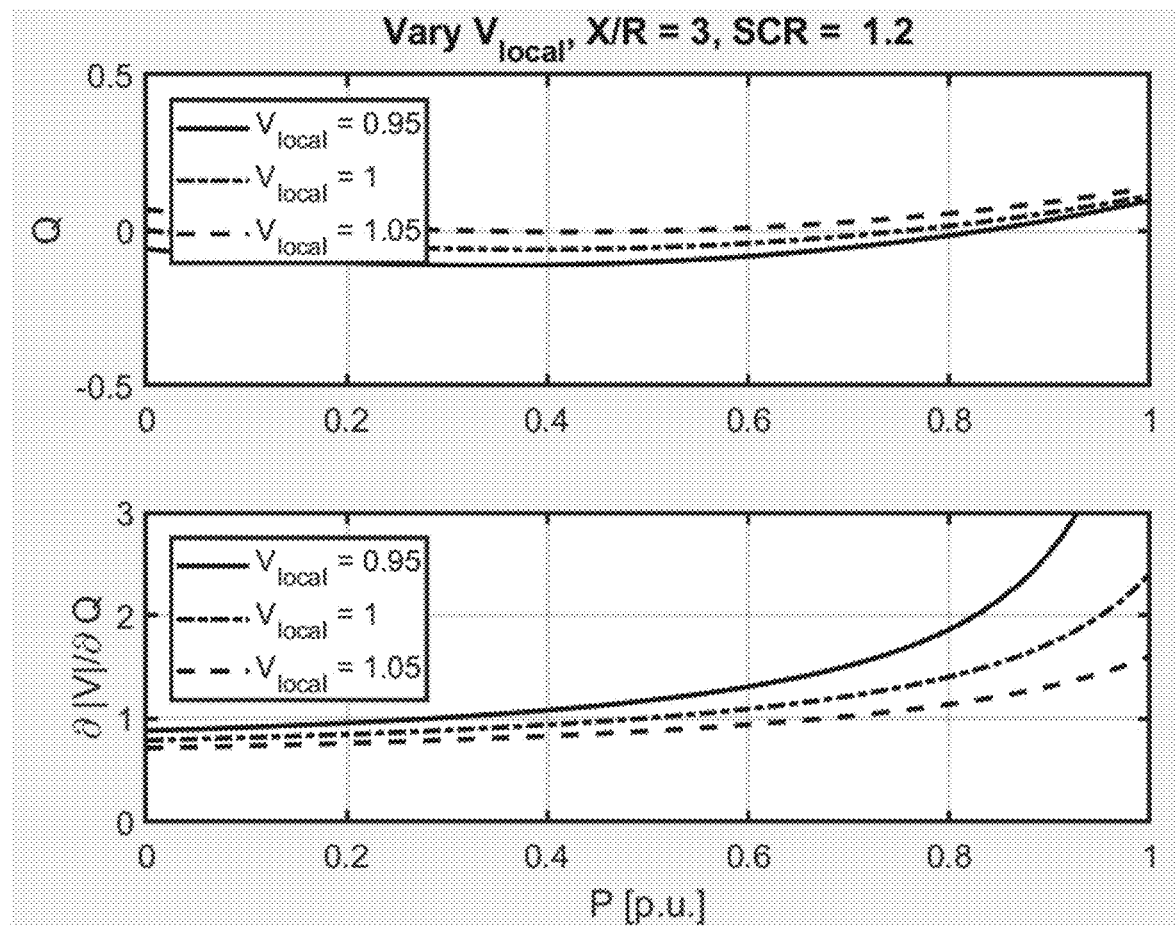
FIG. 3 is a pair of charts relating active power production against i) reactive power and ii) voltage-power relationship value (dV/dQ), respectively, at different grid voltage levels.

The effects of this can be better appreciated by considering the plots in FIG. 3. Here, the upper plot illustrates the reactive power requirement to maintain three different voltage operating points at different active power production levels ranging from 0 pu. to 1 p.u., whilst the lower plot illustrates the dV/dQ ratio those three same voltage levels across the same range of active power production. The inset key tables indicate that the three voltage levels represent 1 p.u., and also 0.95 p.u. and 1.05 p.u.

As can be seen from the upper plot, as the local grid voltage varies between 95% and 105% of the nominal grid voltage, the amount of reactive power required to maintain that voltage level varies across the power production range of up to 1 p.u. Likewise, the dV/dQ ratio, as indicated on the lower plot, varies significantly for each of the three local grid voltage levels, as the active power production level increases. Notably, the curve is more pronounced with lower grid voltage levels and higher power production levels.

This variability means that the ability of the voltage controller 44 to react optimally to changes in detected voltage levels is compromised such that it may command the wind power plant to provide reactive power at a level which is somewhat above or below the level that is actually required. This can cause instability in the grid in the form of an oscillating grid voltage, which is also referred to as 'ringing'.

The invention is directed to addressing this issue by introducing a facility into the voltage control algorithm which determines the dV/dQ ratio dynamically based on one or more measured conditions of the power network. In this way, the reactive power setpoint that is output by the voltage controller 44 is responsive to changes in grid dynamics that effect the SCR ratio of the local power grid and, therefore, the dV/dQ ratio on which the reactive power determination is based.

Referring again to FIG. 2, the dynamic dV/dQ determination facility is represented by an adaptive dV/dQ module 50 which is shown providing an input to the voltage controller 44. It should be noted that the adaptive dV/dQ module 50 is depicted here as a separate functional block for clarity, but it would be appreciated that the functionality performed by it may be integrated within the algorithm embedded in the voltage controller 44 itself. What is more, it is envisaged that the functionality provided by the adaptive dV/dQ module 50 would provide periodically a new dV/dQ value to the voltage controller 44 which it is able to use for the calculation of the reactive power reference value $Q_{PCC\text{-}Ref}$. It is envisaged that the adaptive dV/dQ module 52 will be configured to run at a suitable frequency so as to provide suitable dV/dQ value updates to the voltage controller 44 at a rate that is appropriate to the circumstances. For example, when the Short Circuit Ratio of the grid is relatively stable, the adaptive dV/dQ module 52 may update the voltage controller 44 at an hourly or daily frequency. However, when the grid is less stable and active power is experienced as fluctuating, the adaptive dV/dQ module 52 may update the voltage controller 44 on a more frequent basis, for example in the order or seconds or minutes or at an even higher frequency. Functionality may therefore be provided to monitor the rate of change of various parameters associated with the grid, for example the active power levels, and the dV/dQ values, and to base the update frequency of the voltage controller 44 at least in part on the monitored parameters.

The adaptive dV/dQ module 52 may be implemented in various ways, and some of these will now be explained in further detail below to provide a skilled person with a better appreciation of the functionality.

Figure 4:
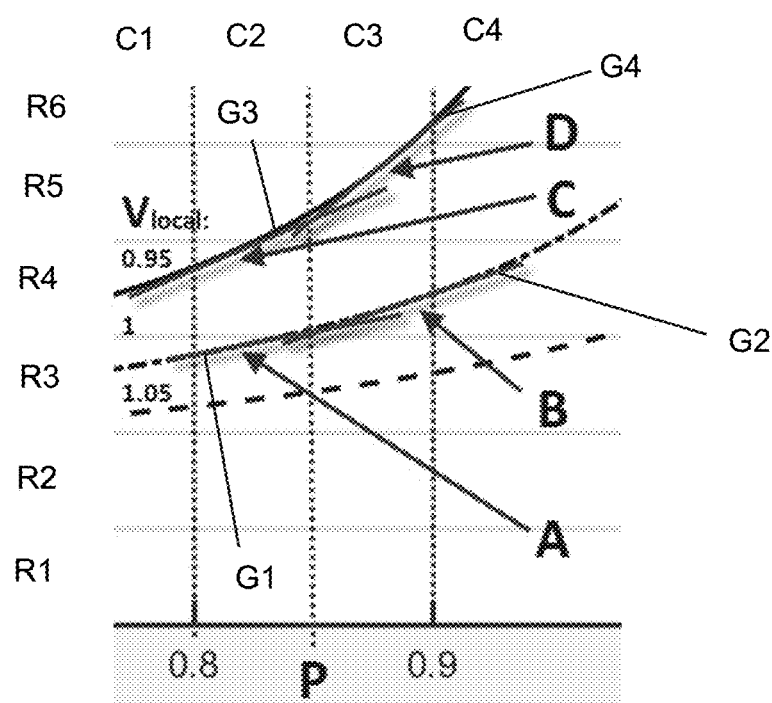
FIG. 4 is a representation of data that may for the basis for populating a data structure/lookup table used by the voltage controller in FIG. 2 in order to determine dynamically a suitable voltage-reactive power relationship value.

In one example, the adaptive dV/dQ module 52 may be implemented by way of a suitable data structure such as a look up table. The look up table would associate, link or otherwise cross reference suitable dV/dQ values against one or more grid conditions, such as active power level and measured grid operating voltage. The data structure/lookup table is represented schematically in FIG. 2 by the reference '53' and would in practice comprise a multi-dimensional array of values, as would be understood by a skilled person. FIG. 4 shows a representation of the data that such a lookup table would contain. It will be noticed that FIG. 4 is an expanded view of the lower plot of FIG. 3 which shows the dV/dQ value against active power production against three different measured grid voltage levels. Overlaid over the plot is a cellular structure which divides the plots into cells or regions, which in this example comprise horizontal divisions/increments of 0.05 p.u (i.e. 5% increments) of active power and vertical divisions/increments of 0.1, in this example, which establish in FIG. 4 a set of rows, labelled R1 to R6, and a set of Columns labelled C1 to C4. To illustrate this example, therefore, there are two neighbouring columns, labelled as C2 and C3 which are established by vertical dividing lines at 0.8 p.u., 0.85 p.u. and 0.9 p.u.

In each region, it will be appreciated that the dV/dQ values are non-linear when considering the plot on its own. Therefore, it is proposed that the data structure linearises the dV/dQ curves by identifying a predetermined dV/dQ ratio for each of the cells, which in the limited viewing perspective of FIG. 4 are established by a grid comprising rows R1-R6 and column C1 to C4, and with respect to each measured grid voltage level.

Some worked examples will now be discussed for further clarification.

Firstly, consider an example where the measured grid voltage is approximately 1 p.u. and the active power production is slightly above 0.8 p.u. Based on these grid conditions, the corresponding cell is R3:C2, which as can be seen is identified here as operating point 'A'. Since the dV/dQ curve is non-linear, the cell contains a value that is determined to be the gradient of the curve in the region of the cell. This is represented by the gradient line labelled as G1.

Next, we consider an example where the measured active power production increases, as compared to the previous worked example, such that it is now at 0.87 p.u, whilst the measured grid voltage remains at about 1 p.u. In this case, therefore, the operating point will move to into cell R4:C3, as indicated by operating point B, which corresponds to a dV/dQ value indicated by gradient line G2.

In the next example, we consider where the active power production drops to between 0.8 p.u and 0.85 p.u, whilst the measured grid voltage redices to about 0.95 p.u. In this case, therefore, the operating point moves to point C, which is in cell R4:C2, which corresponds to a dV/dQ value indicated by gradient line G3.

In the final example, consider that the measured grid voltage remains at approximately 0.95 p.u., but the active power production increases to between 0.85 p.u. and 0.9 p.u., in which case the operating point move to point D which corresponds to cell R5:C3. As can be seen this cell contains a dV/dQ value that corresponds to gradient line G4.

From the above worked examples, it will be appreciated that the adapted dV/dQ module 50 determines a dV/dQ value by querying a suitable data structure that relates grid conditions such as measured grid voltage and measured active power production in order to determine an appropriate dV/dQ value to use within the voltage control algorithm that is implemented by the voltage controller 44.

In the above examples, one option is for the data structure/look up table to be populated in advance, with values that have been determined through appropriate methods such as modelling of the grid. However, in another approach, it is envisaged that the lookup table may be modified during operation in order to update the values of dV/dQ stored within its cells. This may be achieved by online monitoring of grid characteristics. However, an alternative method may be to use a grid estimator to update the data structure. The grid estimator may take the form of a suitable algorithm that is implemented within the adaptive dV/dQ module 50.

An example of one suitable type of grid estimator will now be discussed to provide a fuller understanding.

Grid Estimation Algorithm

Figure 5:
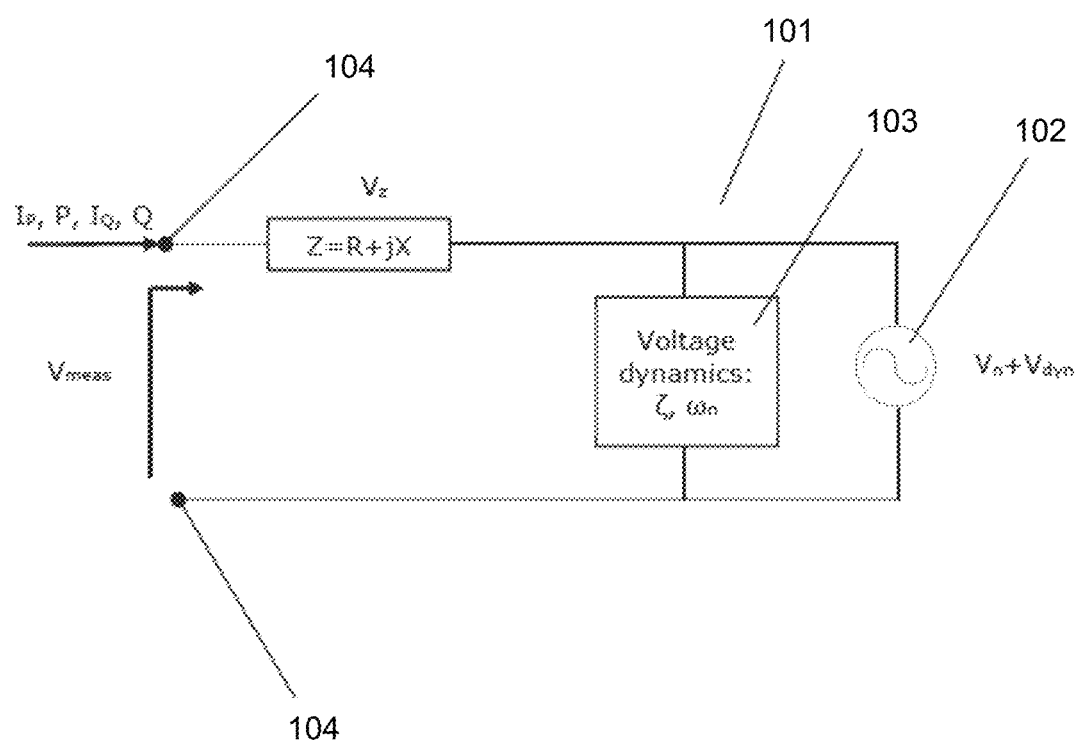
FIG. 5 is a diagram of a Thevenin equivalent circuit representing a power grid as seen from a connection point of a power plant.

FIG. 5 is a schematic diagram illustrating a power grid 101 comprising a voltage source 102 and a grid impedance, Z. The voltage source 102 has a voltage as a sum of the voltages, Vn and Vdyn, wherein Vn is a nominal voltage normally provided by a grid operator, and Vdyn represents an oscillating voltage related to voltage dynamics 103 of the power grid 101.

The grid impedance, Z, is of the complex form Z=R+jX, wherein R is a real part of the grid impedance, Z, representing a resistive part of the grid impedance, Z. Similarly, X is an imaginary part of the grid impedance, Z, representing a reactive part of the grid impedance, Z. Thereby the grid impedance, Z, is represented by a resistance, R, and a reactance, X. There is a voltage, VZ, across the grid impedance, Z.

The voltage dynamics 103 of the power grid 101 are represented by an oscillation frequency, ωn, and a damping ratio, ζ. The damping ratio, ζ, describes the ability of a system to oppose the oscillatory nature of the system's transient response. Furthermore, the oscillation frequency, ωn, describes the frequency at which the voltage dynamics 103 oscillate. Thus, the voltage dynamics 103 of the power grid 101 may be used for gaining knowledge of the transient period of the voltage dynamics 103, how much the voltage dynamics 103 are damped, and when the voltage dynamics 103 reach steady state. Moreover, the oscillating voltage, Vdyn, indicates an amplitude of the voltage dynamics. Thus, Vdyn could, e.g., be estimated from the damping ratio, ζ, and oscillation frequency, ωn.

A voltage, Vmeas, is determined across a point of interconnection 104, e.g. by direct measurement, as would be understood by a skilled person. The point of interconnection 104 is the physical interface between the power grid 101 and a power generating unit (not shown) which delivers power to the power grid 101. Thereby the voltage, Vmeas, is a measure of the voltage between the power grid 101 and the rest of the power system, notably the power generating unit. The voltage, Vmeas, can further be represented as the sum of all voltages of the power grid 101, i.e. Vmeas=Vdyn+Vn+Vz. Furthermore, an active current, IP, and/or an active power, P, delivered by the power generating unit to the power grid 1 is/are determined, e.g. by direct measurement. Further, a reactive current, IQ, and/or a reactive power, Q, delivered by the power generating unit to the power grid 101 is/are also determined, e.g. by direct measurement. The active current, IP, as well as the active power, P, represents the active part of the power which the power generating unit provides to the power grid 101. Similarly, the reactive current, $I_Q$, as well as the reactive power, Q, represents the reactive part of the power which the power generating unit provides to the power grid 101. Thus, information regarding the voltage across the point of interconnection 104, in the form of $V_{meas}$, the active power provided by the power generating unit, in the form of $I_P$ and/or P, and the reactive power provided by the power generating unit, in the form of $I_Q$ and/or Q, is now available.

The voltage, $V_{meas}$, and the active current, $I_P$, and/or the active power, P; and the reactive current, $I_Q$, and/or the reactive power, Q, are then used for estimating the grid impedance, Z. This could include estimating the grid impedance, Z, itself, and/or estimating the resistance, R, and/or the reactance, X, from which values the grid impedance Z can be derived as is well understood. This could, e.g., be done in the following manner. The oscillating voltage, $V_{dyn}$, is derived on the basis of the voltage dynamics 103, and the nominal voltage, $V_n$, is provided by the grid operator, in some examples, although the $V_n$ value could in principle also be estimated. Then the voltage, $V_Z$, across the grid impedance, Z, is calculated from the measured voltage, $V_{meas}$, as $V_Z=V_{meas}-V_n-V_{dyn}$. Finally, the grid impedance, Z, can be estimated by applying Ohm's Law and using $V_Z$ and the determined active current, $I_P$, and/or active power, P; and the determined reactive current, $I_Q$, and/or reactive power, Q.

Figure 6:
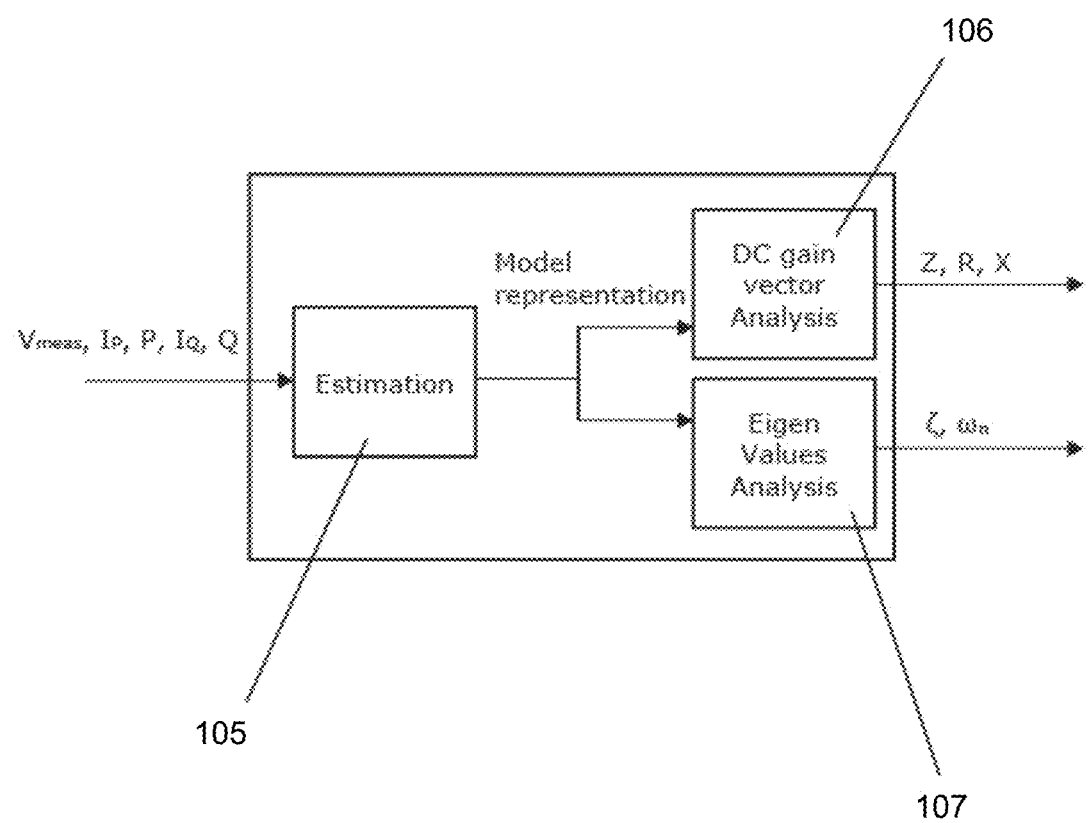
FIG. 6 is a block diagram illustrating the functionality of a grid estimator algorithm that uses measured grid conditions to model other parameters of the power plant and the wider grid.

FIG. 6 is a block diagram illustrating a method according to an embodiment of the invention. A number of input parameters, in the form of $V_{meas}$, $I_P$, P, $I_Q$, and/or Q, which have previously been determined, e.g. in the manner described above with reference to FIG. 5, are fed to an estimator 105 or 'grid estimator' as discussed above, which can be used to determine relevant dV/dQ values for the adaptive dV/dQ module 50.

In the estimator 105, a parameter estimation vector is estimated, based on the input parameters, and using a recursive adaptive filter algorithm, such as a recursive least square algorithm and/or a Kalman algorithm. The parameter estimation vector defines a set of estimated model parameters for a selected model of system response of the power grid. Furthermore, the estimator 105 creates a model representation based on the selected model and the parameter estimation vector, by applying the set of parameters of the parameter estimation vector to the selected model. The model representation is a state space representation of the power grid, which is a mathematical model of the physical system as a set of input, output and state variables. Thus, the model representation depends on the parameter estimation vector, and thereby on changes in voltage and current and/or power parameters which formed the basis of the parameter estimation vector. The estimator 105 outputs the model representation, which is used as an input to DC gain vector analyser 106 and an Eigen values analyser 107.

The DC gain vector analyser 106 calculates a DC gain vector for the power grid 1, using the model representation. Thus, changes in the model representation will be reflected in the calculated DC gain vector. Accordingly, changes in the determined voltage, current and/or power parameters are also reflected in the DC gain vector. The DC gain vector represents a correlation between voltage, on the one hand, and active and reactive power in the other hand, when the power grid is in a steady state. In effect, the gain vector is a list or data array of scalar values that represent the gain from each input value (e.g. active power P and reactive power Q) to the voltage V (that is to say, dV/dP and dV/dQ) when all voltage dynamics have settled, and so could also be considered to be a steady state vector.

The DC gain vector analyser 106 uses the DC gain (for example dV/dP and dV/dQ) to derive a grid impedance, Z, and/or a resistance, R, of the grid impedance, Z, and/or a reactance, X, of the grid impedance, Z, from the DC gain vector. For this reason, any changes in the calculated DC gain vector and in the determined voltage, current and/or power parameters will be reflected in the derived grid impedance, Z, and/or a resistance, R, of the grid impedance, Z, and/or a reactance, X, of the grid impedance, Z. Furthermore, this is an easy and fast manner of estimating the grid impedance, and accordingly the system may react fast to any changes in the grid impedance.

The derived grid impedance, Z, resistance, R, and/or a reactance, X, may further be used for deriving a short circuit ratio (SCR) of the power grid 1, a X/R ratio, an absolute value of the grid impedance, |Z|, and an angle, θ, of the grid impedance, Z. The Eigen values analyser 107 derives a damping ratio, ζ, and an oscillation frequency, ωn, on the basis of the model representation. The damping ratio, ζ, and the oscillation frequency, ωn, represent the voltage dynamics 104 of the power grid 1, and could, e.g., be used for estimating an oscillating voltage, $V_{dyn}$, of the power source 102 of the power grid 101, as described above with reference to FIG. 5. Thus, based on the input parameters $V_{meas}$, $I_P$, P, $I_Q$, and/or Q, an estimation is performed by the estimator 105. The estimator 105 estimates a parameter estimation vector and creates a model representation based on the parameter estimation vector. The model representation is used as an input to the DC gain vector analyser 106 and the Eigen values analyser 107.

Beneficially, therefore, the grid estimator 105 enables a value of SCR to be determined which in turn allows a value of dV/dQ to be determined and stored in the lookup table of the adaptive dV/dQ module 50. More specifically, the DC gain vector analyser 106 enables the determination of a relationship between a change in grid voltage in response to a change in reactive current (dV/dI$_Q$) and, form this, it is possible calculate dV/dQ value by multiplying dV/dI$_Q$ by the voltage at the point of common connection (Vpcc).

As an enhancement to the adaptive dV/dQ module 50 discussed above, it should be noted that the grid estimator 105 algorithm discussed here enables the electric grid characteristics to be monitored continuously therefore enabling an evolution of the value set stored in the lookup table in the adaptive dV/dQ module 50, thereby ensuring accuracy of the determination.

As a further alternative, the grid estimator 105 can be configured to provide real time determination of dV/dQ values which can be used by the adaptive dV/dQ module to update the voltage controller 44 with relevant variables to perform its voltage control functionality.

Figure 7:
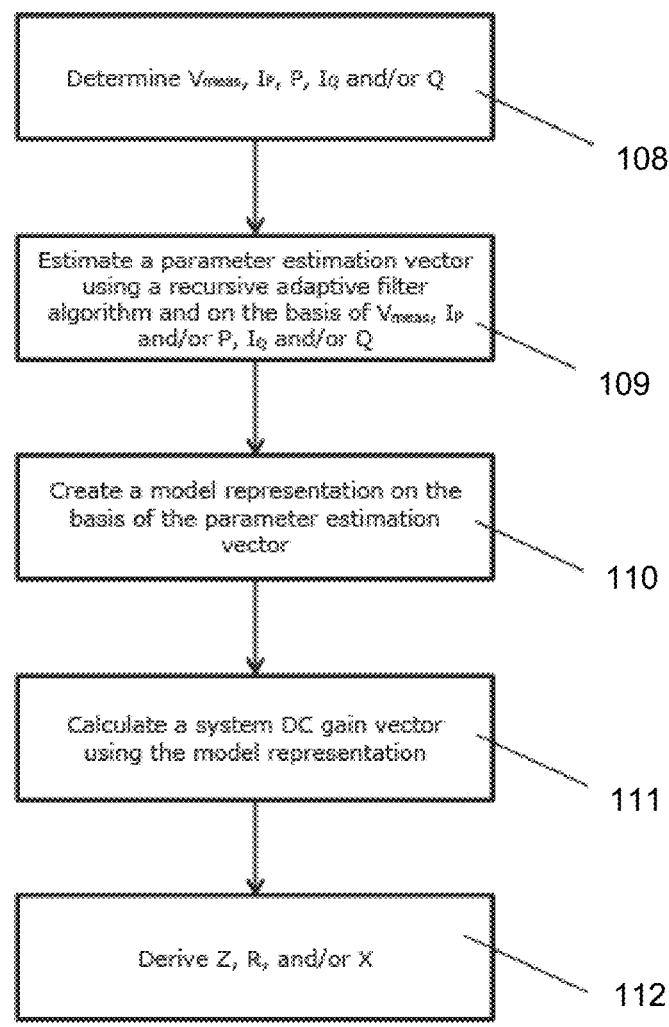
FIG. 7 is a flow chart of an algorithm relating to the grid estimator of FIG. 6.

FIG. 7 is a flow chart illustrating a method according to an embodiment of the invention. The method is initiated by a first step 108, in which a voltage, $V_{meas}$, an active current, $I_P$, and/or an active power, P; and a reactive current, $I_Q$, and/or a reactive power, Q, are determined. $V_{meas}$, $I_P$, and/or P; and $I_Q$, and/or Q may be determined in the manner described above with reference to FIGS. 5 and 6.

In a second step 109, a parameter estimation vector is estimated using a recursive adaptive filter algorithm, such as a recursive least square algorithm or a Kalman algorithm, and on the basis of $V_{meas}$, $I_P$, and/or P; and $I_Q$, and/or Q, e.g. in the manner described above with reference to FIG. 6.

In a third step 110, a model representation is created on the basis of the parameter estimation vector, e.g. in the manner described above with reference to FIG. 6.

In a fourth step 111, the model representation is used for calculating a system DC gain vector, e.g. in the manner described above with reference to FIG. 6.

In a fifth step 112, a grid impedance, Z, and/or a resistance, R, of the grid impedance, Z, and/or a reactance, X, of the grid impedance, Z, is derived, e.g. in the manner described with reference to FIGS. 5 and 6.

Figure 8:
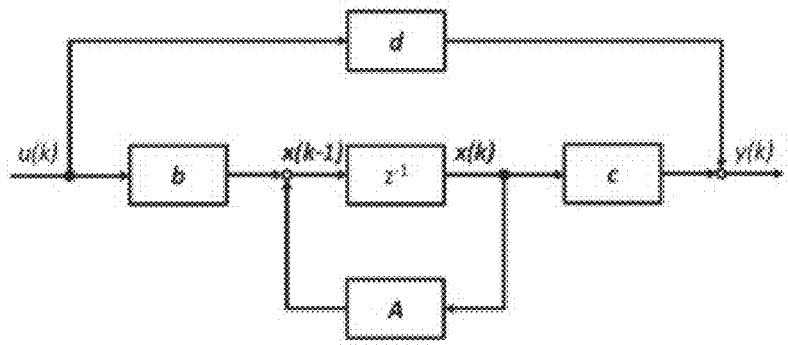
FIG. 8 is a block diagram illustrating a state space model for use in the grid estimator in FIG. 6.

FIG. 8 is a block diagram illustrating a state space model for use in a method according to an embodiment of the invention, in the form of a multiple input, single output model. An input, u(k), representing active and reactive current of the system, is input to the state space model, and an output, y(k), representing voltage, $V_{meas}$, is output by the state space model. A, B, C and D represent static and dynamic behaviour of the system, and may be in the form of suitable matrixes.

A parameter estimation vector defines parameters to be applied to the matrices in order to create a model representation of the actual power grid.

The model representation of FIG. 4 is of the form:

$$\dot{x}(t) = Ax(t) + Bu(t)$$
$$y(t) = Cx(t) + Du(t), D = 0$$
$$\Downarrow$$
$$\begin{bmatrix} \dot{x}_1(t) \\ \dot{x}_2(t) \end{bmatrix} = \begin{bmatrix} a1 & a2 \\ a3 & a4 \end{bmatrix}\begin{bmatrix} x_1(t) \\ x_2(t) \end{bmatrix} + \begin{bmatrix} b1 & b2 \\ b3 & b4 \end{bmatrix}\begin{bmatrix} I_P(t) \\ I_Q(t) \end{bmatrix}$$
$$y(t) = \begin{bmatrix} c1 & c2 \end{bmatrix}\begin{bmatrix} x_1(t) \\ x_2(t) \end{bmatrix}, y(t) = V_Z(t) + V_{dyn}(t)$$

The matrix A represents dynamics of the system, the matrixes B and C represent gain of the system, B being an input matrix and C being an output matrix, and the matrix D represents feedforward of the system, which may be set to zero and thereby not taken into account.

It will be appreciated that various changes and modifications can be made to the present invention without departing from the scope of the present application. Some variations on the illustrated examples of the invention have been discussed above. Others will now be explained further below.

In the above discussion, the voltage-power relationship (dV/dQ) has been explained as being able to be determined by way of a data structure which tabulates a range of such values against active power production levels of the grid and also the prevailing local grid voltage. The lookup table data may be determined prior to installation of the wind power plant, or alternatively the lookup table may be continuously updated in real time (i.e. run time updates) based on the output of a grid estimator (105) that is operable to monitor various grid conditions and derive values for the voltage-power relationship in order to update various cells of the lookup table.

In another example, however, the voltage-power relationship values (dV/dQ) in the lookup table may be populated based on information relating to the voltage angle on the local grid. In this example, the voltage angle can be determined from two phasor measurement units (PMUs). One of the PMUs may be positioned at or in the Thevenin equivalent point in the power grid, whilst the other PMU may be located near to the power plant. For clarity, two possible locations are indicated in FIG. 1, with the two PMUs noted as PMU1 and PMU2.

Figure 9:
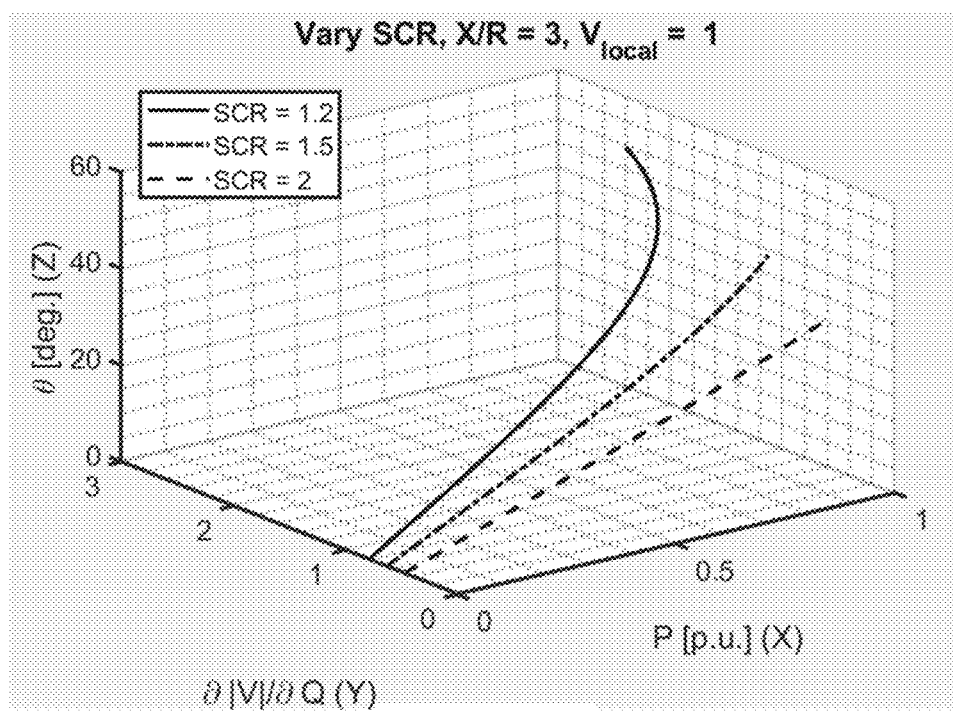
FIG. 9 is a chart that depicts the relationship between voltage angle to dV/dQ and active power production at three different SCR values (grid strength), which relationship can be used to populate the lookup table in FIG. 2 of the voltage controller for dynamic calculation of voltage-power relationship values, as an alternative to using the grid estimator of FIGS. 5 to 8.

Once the voltage angle has been determined, it is possible to derive voltage-reactive power relationship values (dV/dQ) based also on the prevailing active power production point. The chart shown in FIG. 9 represents a relationship between active power production (P) in p.u. of the power plant on the X axis, dV/dQ on the Y axis, and voltage angle (θ) on the Z axis, in the context of three difference SCR values. As will be appreciated from FIG. 9, the voltage-reactive power relationship value (dV/dQ) varies significantly with different values of SCR. The information contained in such a relationship can be used to derive appropriate dV/dQ values in order to populate the lookup table 53. For example, one option is to establish a plurality of bins, or data storage elements, each bin comprising a range of values of active power production, and/or a range of values of voltage angle. Each of the bins, therefore, would further comprise a number of cells, each of the cells within the bin relating to a different voltage level and which would be loaded with a corresponding dV/dQ value.

Figure 10:
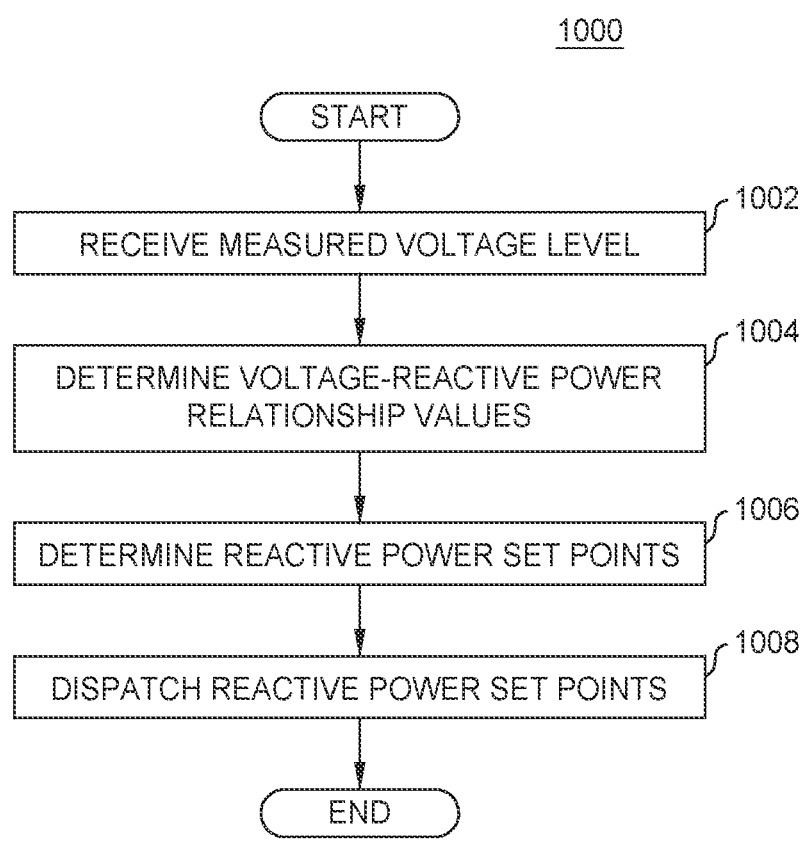
FIG. 10 is a flowchart of an example method.

FIG. 10 is a flowchart of an example method 1000. In some embodiments, the PPC performs the method 1000. In block 1002, the PPC receives a measured voltage level. For example, the PPC may receive a measured voltage level of a power network to which one or more renewable power generators are connected.

In block 1004, the PPC determines voltage-reactive power relationship values (dV/dQ values). The dV/dQ values may indicate changes in voltage corresponding to changes in reactive power. The PPC may dynamically determine the dV/dQ values based on one or more power network conditions. For example, the PPC may reference a data structure that provides the dV/dQ values for certain power network conditions. The PPC may determine different dV/dQ values over time as conditions of the power network change.

In block 1006, the PPC determines reactive power set points. For example, the PPC may determine voltage error values between a voltage reference value and the measured voltage level. The PPC then determines reactive power set points using the dV/dQ values and the voltage error values. In block 1008, the PPC dispatches the reactive power set points to the one or more renewable power generators. In this manner, the PPC operates the renewable power generators to produce reactive power based on the reactive power set points.

The invention claimed is:

1. A method for controlling one or more renewable power generators forming a renewable power plant, the method comprising:
   receiving a measured voltage level of a power network to which the one or more renewable power generators are connected;
   determining reactive power set points for the one or more renewable power generators based on the measured voltage level; and
   operating the one or more renewable power generators so that the one or more renewable power generators produce reactive power to the power network based on the reactive power set points, wherein determining the reactive power set points for the one or more renewable power generators based on the measured voltage level comprises:
      determining, based on one or more power network conditions and by referring to a predetermined data structure comprising a plurality of voltage-reactive power relationship values linked to one or more power network conditions, a first voltage-reactive power relationship value of the plurality of voltage-reactive power relationship values, wherein the plurality of voltage-reactive power relationship values indicate of changes in voltage corresponding to changes in reactive power;
      determining a voltage error value between a voltage reference value and the measured voltage level; and
      determining a first reactive power set point based on voltage error value and the first voltage-reactive power relationship value;
   in response to determining a change in the one or more power network conditions, determining, by referring to the predetermined data structure, a second voltage-reactive power relationship value of the plurality of voltage-reactive power relationship values, wherein the second voltage-reactive power relationship value is different from the first voltage-reactive power relationship value; and
      determining, based on the second voltage-reactive power relationship value, a second reactive power set point different from the first reactive power set point.

2. The method of claim 1, wherein the predetermined data structure is populated with the plurality of voltage-reactive power relationship values by a grid estimator module.

3. The method of claim 2, wherein the first voltage-reactive power relationship value is derived from a gain value that represents a correlation between the measured voltage level, an active power output level, and a reactive power output level, at a steady state of the power network.

4. The method of claim 1, wherein the one or more power network conditions on which the first voltage-reactive power relationship value is determined comprises an active power production of the one or more renewable power generators, and wherein the method comprises:
   determining the active power production of the one or more renewable power generators; and
   determining the first voltage-reactive power relationship value based on the active power production.

5. The method of claim 1, wherein the one or more power network conditions on which the first voltage-reactive power relationship is determined comprises a voltage angle, and wherein the method comprises:
   determining the voltage angle; and
   determining the first voltage-reactive power relationship based value on the voltage angle.

6. The method of claim 5, wherein determining the voltage angle comprises receiving, from each of two phase measurement units, a voltage phase, and determining, based on the voltage phases received from the phase measurement units, a voltage angle, wherein a first phase measurement unit of the two phase measurement units is positioned at a modelled Thevenin equivalent point of the power network and wherein a second phase measurement unit of the two phase measurement units is positioned at a point in the power plant.

7. The method of claim 1, wherein determining the first voltage-reactive power relationship value is based on at least one of an active power production of the one or more renewable power generators or a voltage angle, wherein the method further comprises:
   determining, from a plurality of bins, a bin corresponding to the active power production or voltage angle, wherein the plurality of bins correspond to a range of values of at least one of the active power production or voltage angle; and
   determining the first voltage-reactive power relationship value based on the determined bin.

8. The method of claim 7, wherein the one or more power network conditions on which the voltage-reactive power relationship value is determined further comprises the measured voltage level, and wherein determining the first voltage-reactive power relationship value further comprises:
   determining, from a plurality of cells within the determined bin, a cell that corresponds to the measured voltage level, wherein the plurality of cells correspond to a range of voltage values; and
   determining the first voltage-reactive power relationship value based on the determined cell.

9. The method of claim 1, wherein determining the first voltage-reactive power relationship value comprises receiving the first voltage-reactive relationship value from a grid estimator.

10. The method of claim 9, comprising determining, using the grid estimator, the first voltage-reactive power relationship value based on a gain value that represents a correlation between the measured voltage level, an active power output level, and a reactive power output level, at a steady state of the power network.

* * * * *